United States Patent
Sandler et al.

(10) Patent No.: US 11,902,386 B2
(45) Date of Patent: Feb. 13, 2024

(54) SMART DEVICE DATA ACCESS ADAPTER

(71) Applicant: Rockwell Automation Technologies, Inc., Mayfield Heights, OH (US)

(72) Inventors: Nathaniel Scott Sandler, Chagrin Falls, OH (US); Ryan Benjamin Coon, Franklin, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 17/840,690

(22) Filed: Jun. 15, 2022

(65) Prior Publication Data
US 2023/0412696 A1 Dec. 21, 2023

(51) Int. Cl.
| G06F 15/16 | (2006.01) |
| H04L 67/00 | (2022.01) |
| H04L 69/08 | (2022.01) |
| H04L 67/12 | (2022.01) |

(52) U.S. Cl.
CPC .............. *H04L 67/34* (2013.01); *H04L 69/08* (2013.01); *H04L 67/12* (2013.01)

(58) Field of Classification Search
CPC .......... H04L 67/34; H04L 69/08; H04L 67/12
See application file for complete search history.

(56) References Cited

U.S. PATENT DOCUMENTS

2014/0337277 A1* 11/2014 Asenjo .................. G06Q 10/06
   707/603
2019/0064787 A1* 2/2019 Maturana ........... G05B 23/0227

OTHER PUBLICATIONS

Edge Orchestration for Azure IoT: Enabling end-to-end security, deployment, management, and monitoring for Azure IoT solutions. ZEDEDA Microsoft, Partner Solution Brief. (2021).

* cited by examiner

*Primary Examiner* — Normin Abedin
(74) *Attorney, Agent, or Firm* — Amin, Turocy & Watson, LLP

(57) ABSTRACT

An industrial device data access adapter allows migration of operational technology (OT) data to a cloud platform to be executed and managed using the same cloud infrastructure used to manage migration of information technology (IT) data. The adapter is designed to be installed and executed as a containerized module on an IoT edge system or device. The adapter interfaces with industrial devices to collect data using native OT data format and communication protocols, and leverages the existing software framework of the IoT edge system—including data broker services and module management services—to move this data to a cloud platform. Since the adapter is designed to interface with the native framework of the IoT edge system on which the adapter executes, the adapter can be managed using through the existing IoT infrastructure of the cloud provider.

20 Claims, 10 Drawing Sheets

_US 11,902,386 B2_

SMART DEVICE DATA ACCESS ADAPTER

TECHNICAL FIELD

The subject matter disclosed herein relates generally to industrial automation systems, and, for example, to migration of industrial data to cloud-based services and applications.

BACKGROUND ART

In recent years businesses have begun migrating their information technology (IT) applications and workloads to cloud platforms. Many industrial enterprises that own and operate industrial automation systems are attempting to do the same with their operational technology (OT) data and systems. This process could be simplified if the same cloud platform technologies used to migrate IT workloads to a cloud platform—such as Microsoft's Azure Internet of Things (IoT) Edge or other such systems—could also be used to migrate OT data and applications. However, many of the industrial devices that would act as data sources generate and present data using protocols that are specific to the industrial space, such as Common Industrial Protocol (CIP). In some cases, these protocols are proprietary to specific industrial device vendors. This makes it difficult to use existing IT cloud solutions to move OT data to the cloud.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising an edge gateway core component configured to communicatively interface with, and collect industrial data from, industrial devices that generate data conforming to an operational technology (OT) protocol; and an interface adapter component configured to use a data broker service of an edge system to migrate the industrial data to a cloud platform, and to configure the edge gateway core component in accordance a management instruction from a module management service of the edge system.

Also, one or more embodiments provide a method, comprising communicatively interfacing, by an edge gateway core component of an adapter module installed on an edge device, with industrial devices that generate data conforming to an operational technology (OT) protocol; collecting, by the edge gateway core component, the industrial data from the industrial devices; coordinating, by an interface adapter component of the adapter module, with a data broker service of the edge device to migrate the industrial data to a cloud platform; and configuring, by the interface adapter component, the collecting and the coordinating in accordance a management instruction from a module management service of the edge device.

Also, according to one or more embodiments, a non-transitory computer-readable medium is provided having stored thereon instructions that, in response to execution, cause an edge system comprising a processor to perform operations, the operations comprising communicatively interfacing, by an edge gateway core component of an adapter application installed on the edge device, with industrial devices that generate data conforming to an operational technology (OT) protocol; collecting, by the edge gateway core component, the industrial data from the industrial devices; coordinating, by an interface adapter component of the adapter application, with a data broker service of the edge device to migrate the industrial data to a cloud platform; and configuring, by the interface adapter component, the collecting and the coordinating based on a management instruction from a module management service of the edge system.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
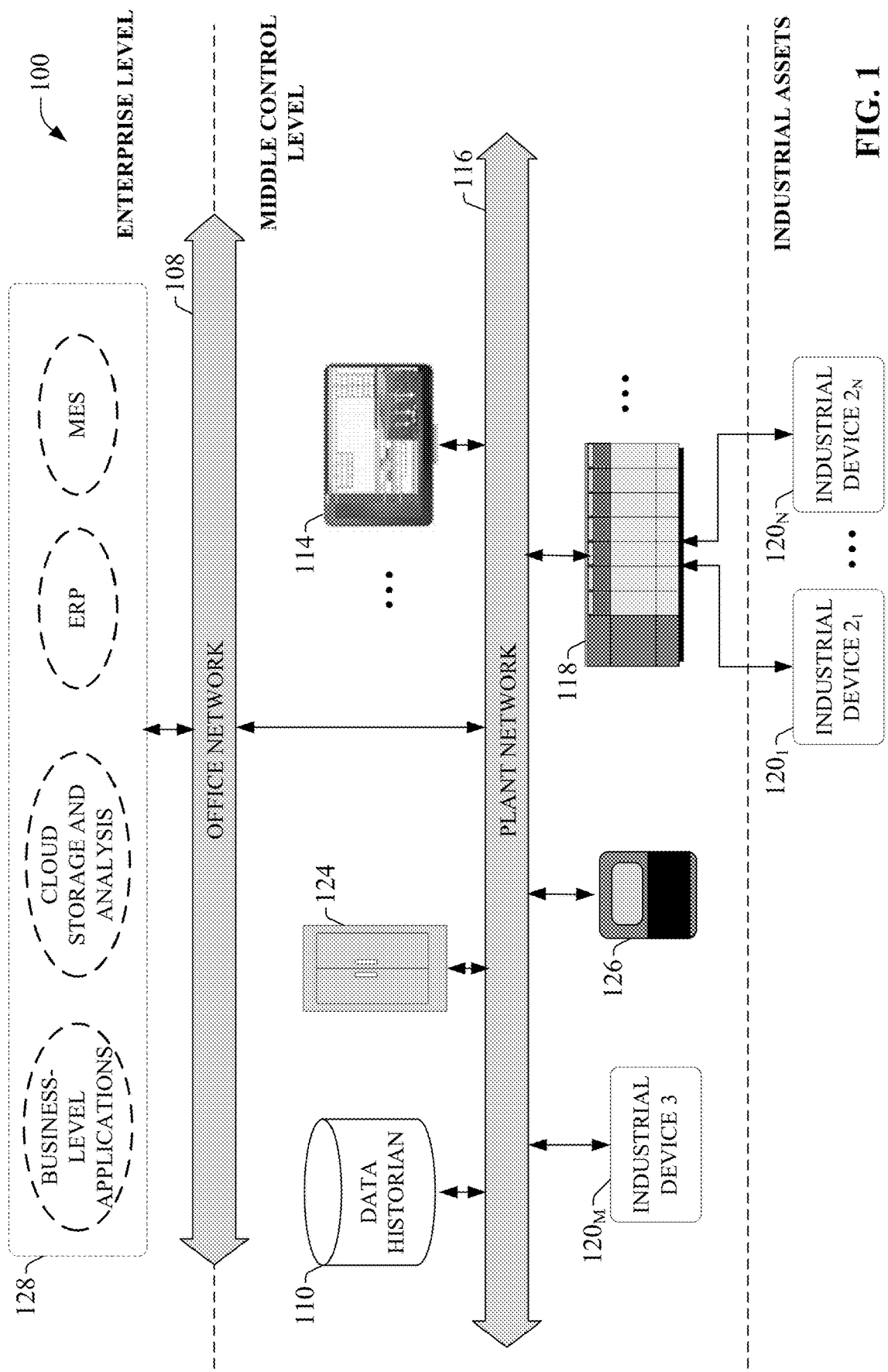
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with networked industrial devices $120_M$ over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, motor control centers 124 that house motor control devices, motor drives such as variable frequency drives 126, vision systems, or other such systems.

Higher-level systems 128 may carry out functions that are less directly related to control of the industrial automation systems on the plant floor, and instead are directed to long term planning, high-level supervisory control, analytics, reporting, or other such high-level functions. These systems 128 may reside on the office network 108 at an external location relative to the plant facility, or on a cloud platform with access to the office and/or plant networks. Higher-level systems 128 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

In recent years businesses have begun migrating their information technology (IT) applications and workloads to cloud platforms. Many industrial enterprises that own and operate operational technology (OT) systems, such as those described above, are attempting to do the same with their OT data and systems. This process could be simplified if the same cloud platform technologies used to migrate IT workloads to a cloud platform—such as Microsoft's Azure Internet of Things (IoT) Edge or other such systems—could also be used to migrate OT data and applications. However, many of the industrial devices that would act as data sources are configured to generate and communicate data using protocols that are specific to the industrial space, such as Common Industrial Protocol (CIP), and in some cases are proprietary to specific industrial device vendors. This makes it difficult to use existing IT cloud solutions to move OT data to the cloud. While some OT-specific cloud migration solutions are available, these solutions cannot be managed through the same cloud infrastructure provided by the cloud platform provider.

To address these and other issues, one or more embodiments described herein provide an industrial device data access adapter that can execute as a containerized module on an IoT edge system, and is capable of interfacing with industrial devices to collect data using native OT communication protocols and leveraging the existing software framework of the IoT edge system to move this data to a cloud platform. Since the adapter is designed to interface with the native framework of the IoT edge on which the adapter executes, the adapter can be managed using through the existing IoT infrastructure of the cloud provider.

Figure 2:
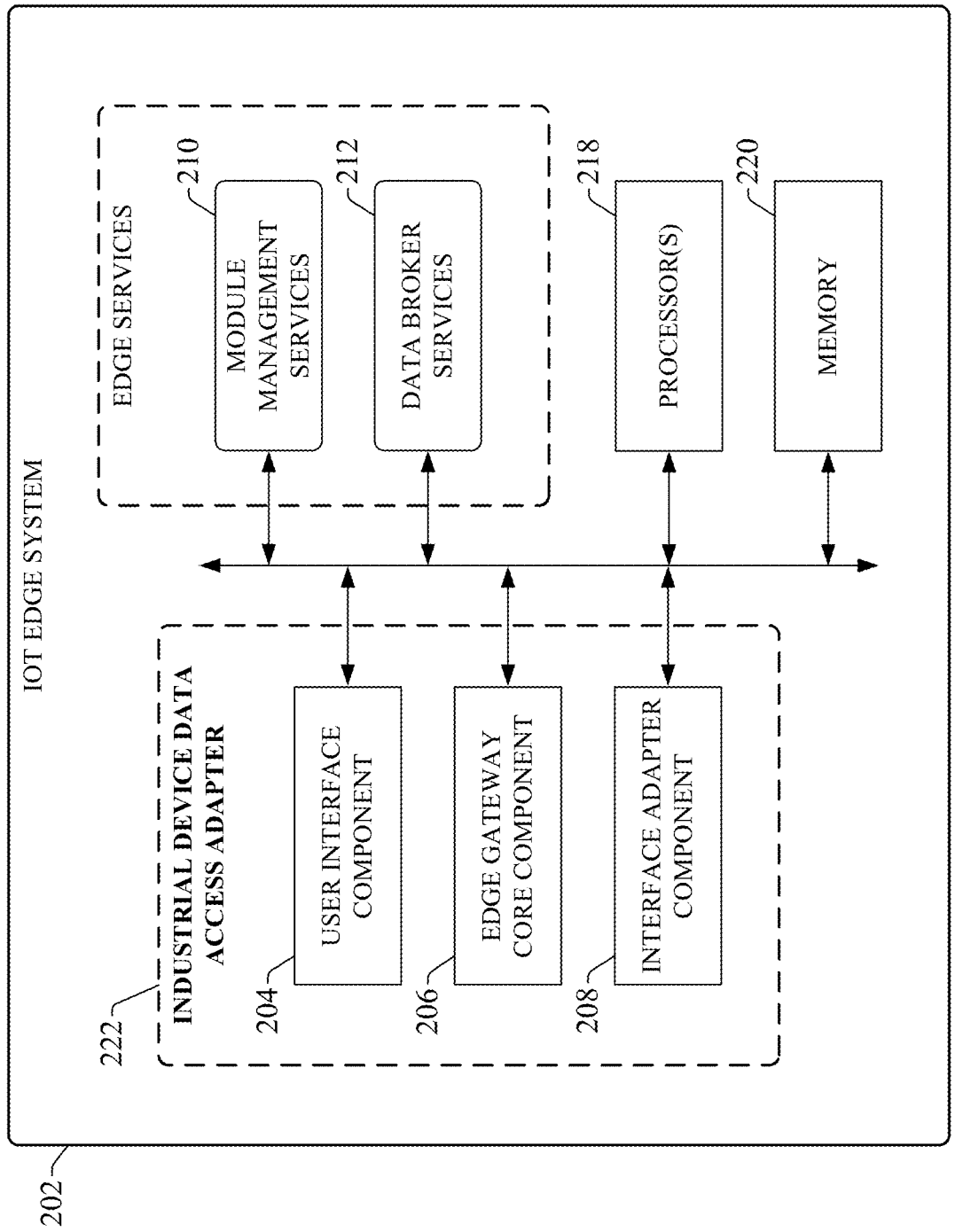
FIG. 2 is a block diagram of an example IoT edge system on which an industrial device data access adapter has been installed.

FIG. 2 is a block diagram of an example IoT edge system 202 on which an industrial device data access adapter 222 has been installed according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IoT edge system 202 can support a number of services designed to manage migration of data from IT applications to cloud-based applications. These services can include module management services 210 and data broker services 212. These services act as a proxy for data consumption and management services that are operated on, and controlled through, the cloud platform, and may be provided by a vendor of the cloud platform as part of the cloud architecture. An industrial device data access adapter 222 can be installed on the IoT edge system 202 as a containerized application that facilitates collection of data from industrial (OT) devices, and that leverages the services 210 and 210 to migrate this industrial data to the cloud.

Adapter 222 can include a user interface component 204, an edge gateway core component 206, and an interface adapter component 208. IoT edge system 202 can also include one or more processors 218, and memory 220. In various embodiments, one or more of the user interface component 204, edge gateway core component 206, interface adapter component 208, module management services 210, data broker services 212, the one or more processors 218, and memory 220 can be electrically and/or communicatively coupled to one another to perform one or more of the functions of the IoT edge system 202. In some embodiments, components 204, 206, 208, 210, and 212 can comprise software instructions stored on memory 220 and executed by processor(s) 218. IoT edge system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to exchange information between the IoT edge system 202 and a client device having authorization to access the system 202. In some embodiments, user interface component 204 can be configured to generate and deliver interface displays to the client device that allow the user to browse data tags or smart objects discovered on industrial devices, select data items to be migrated to a cloud platform, or perform other such interactions with the system 202. In some embodiments, user interface component 204 can also visualize collected data in various formats, including time-series plots or animated visualizations.

Edge gateway core component 206 can be configured to connect to, and access data on, industrial devices deployed in a plant facility, including but not limited to industrial controllers, motor drives such as variable frequency drives, or other such industrial data sources. Interface adapter component 208 can be configured to convert the data from its native presentation and communication protocol—e.g. CIP protocol—to a protocol that can be processed by the IoT edge system's data broker services 212 and module management services 210 (e.g., MQ telemetry transport, or MQTT).

Adapter interface component 208 can be configured to interface with the IoT edge system's data broker services 212 to facilitate egress of the converted industrial data to an IoT hub or to another application that resides and executes on a cloud platform. The adapter interface component 208 can also be configured to interface with the module management services 210 to allow the adapter 222 to be managed through a vendor-specific cloud infrastructure.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
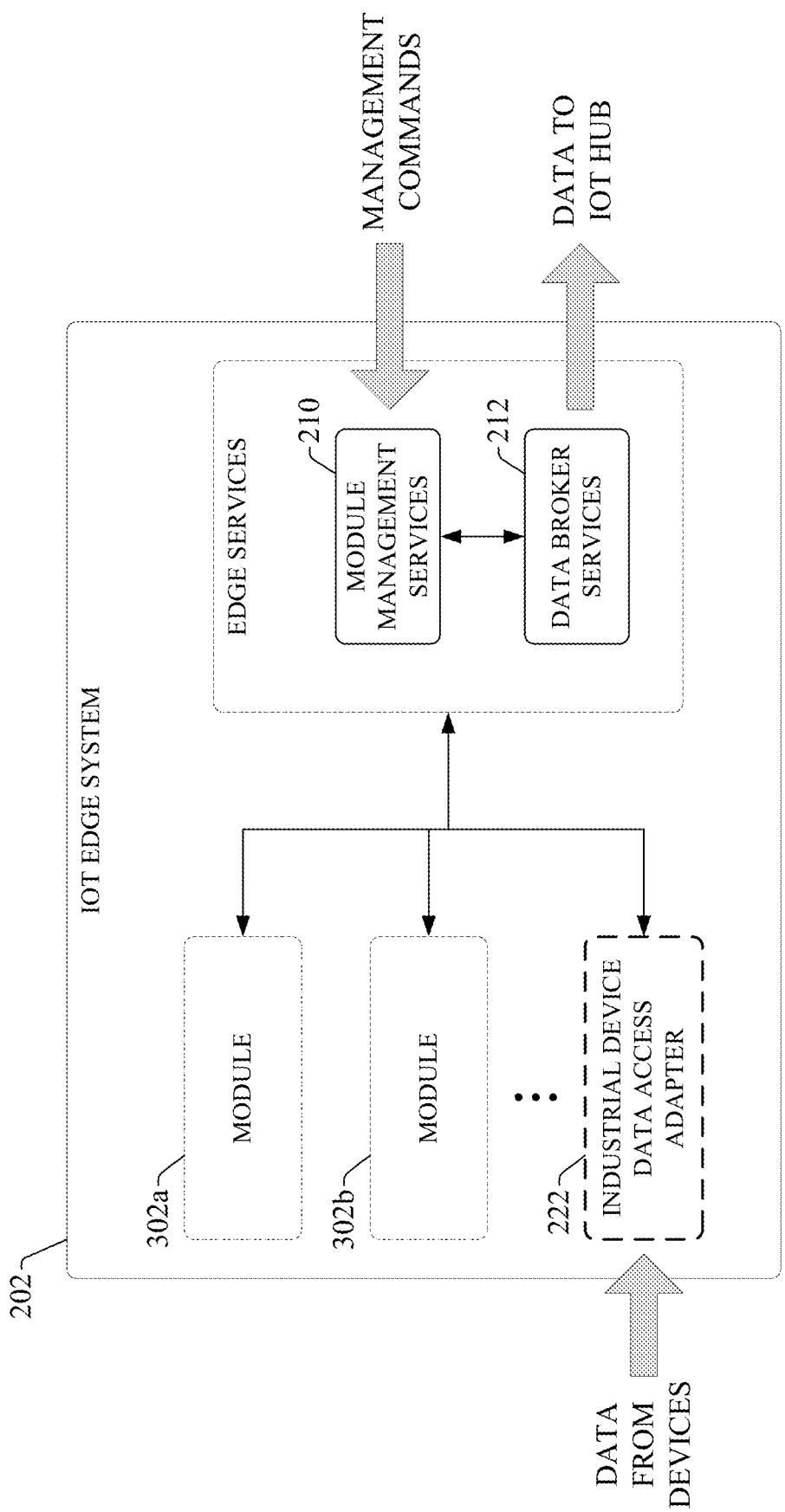
FIG. 3 is a diagram illustrating a general architecture of an IoT edge system with an industrial device data access adapter installed as a module.

FIG. 3 is a diagram illustrating a general architecture of an IoT edge system 202 with an industrial device data access adapter 222 installed as a module. As noted above, the IoT edge system 202 is configured to execute module management services 210 and data broker services 212 that are designed to interface the edge system 202 with an IoT hub executing on a cloud platform. The IoT hub performs both data ingestion functions as well as management of the IoT edge system 202 itself. The edge services 210 and 212 collectively act as a proxy for the IoT hub, executing management commands originating from the IoT hub and brokering data communication between the system 202 and the IoT hub.

The IoT edge system 202 also acts as an operating system capable of executing containerized applications, or modules 302, which can be installed on the system 202 and which execute respective functions. Modules 302 can be designed to execute analytic applications, visualization applications, data processing, or other such functions, and may include custom applications. Modules 302 can leverage the data broker services 212 to exchange data with one another and to send data to the cloud platform. Thus, the IoT edge system 202 allows a user to install selected combinations of modules 302 on the system 202 as needed to satisfy the requirements of a cloud migration solution.

The modules 302 can also be managed from the cloud architecture using the system's module management services 210. For example, an administrator can use an interface associated with the cloud platform (e.g., an interface associated with the cloud platform's IoT hub) to submit a request to deploy a selected module 302, or set of modules 302, to the IoT edge system 202. In response to this request, the IoT hub can send a management command to the module management services 210 executing on the selected IoT edge system 210, instructing the edge system 202 which modules 302 are to be retrieved and installed. The module management services 210 then retrieve the specified modules 302 from a container registry maintained on the cloud platform, and installs and configures the modules 302 in accordance with the module deployment commands received from the cloud platform.

Modules 302 are typically be designed to collect and process data within the context of an IT environment, and to use the data broker services 212 to migrate this data to a cloud-based application. These modules 302 are not typically designed to collect and process data from OT or industrial devices, such as CIP data generated by industrial controllers or other types of industrial devices. To address this issue, the industrial device data access adapter 222 described herein is configured to execute on the IoT edge system 202 as another containerized module, and to act as an interface between OT data from industrial devices and the edge services 210, 212 of the IoT edge system 202.

Figure 4:
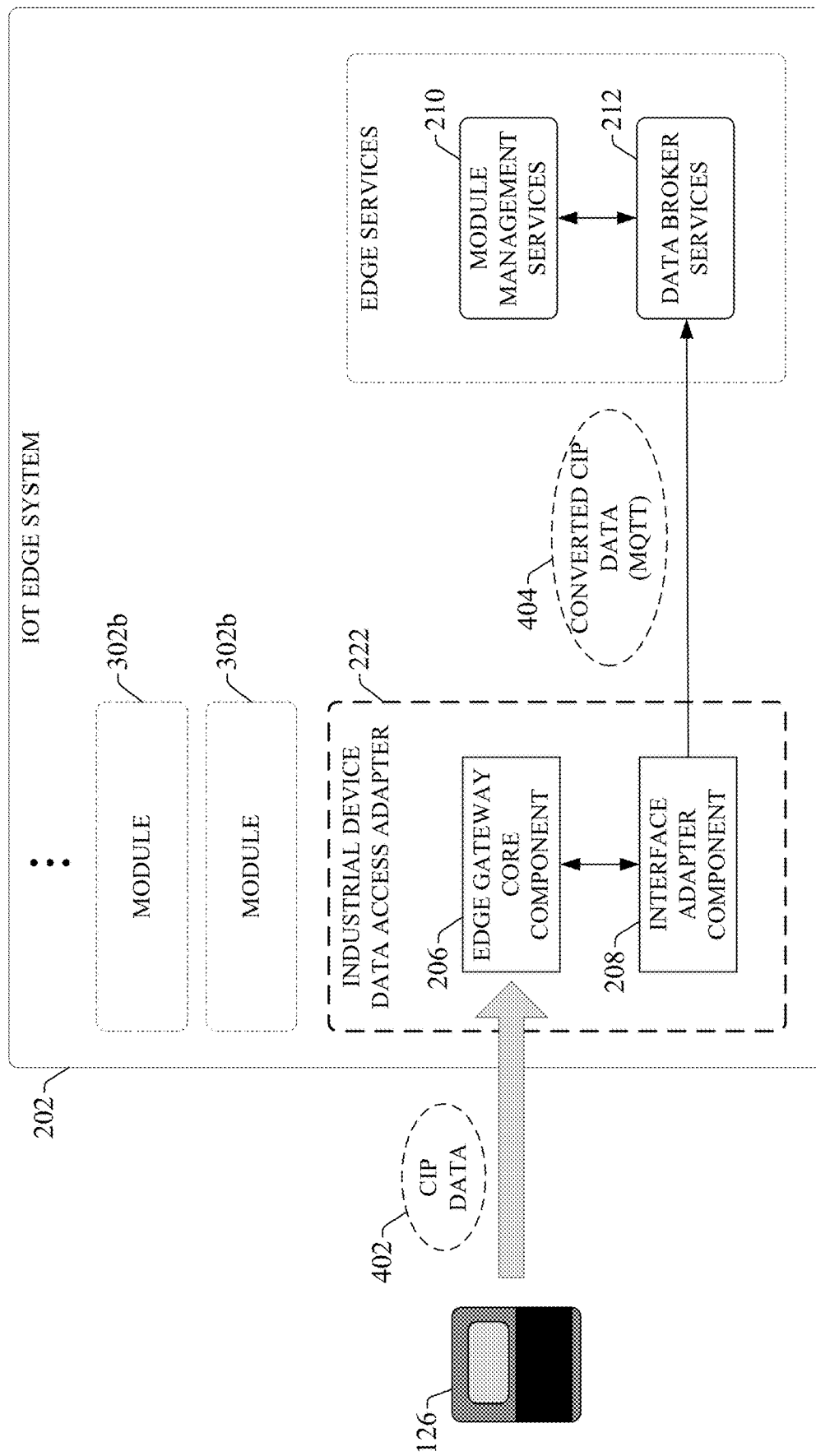
FIG. 4 is a diagram illustrating collection and conversion of industrial data for exchange with an IoT edge system's data broker services.

FIG. 4 is a diagram illustrating collection and conversion of industrial data—e.g., CIP data 402—for processing by the IoT edge system's data broker services 212. The adapter 222 is configured to execute as another module within the IoT edge framework, and as such can exchange data with other installed modules 302 using the data broker services 212. The data broker services 212 coordinate the exchange of data between modules 302, adapter 222, and the cloud platform.

Also similar to the modules 302, the adapter 222 can be deployed to the IoT edge system 202, configured, and managed by the module management services 210 based on management commands received from the IoT hub executing on the cloud platform. In this way, the adapter 222 can be managed using the same cloud architecture used to manage the other modules 302 on the system.

In the example depicted in FIG. 4, the adapter 222 is collecting data from a variable frequency drive 126 (e.g., speed data, frequency data, current data, etc.). However, the adapter 222 can be configured to use the IoT edge system's resources to collect data from other types of industrial devices, including but not limited to industrial controllers such as PLCs, telemetry devices (e.g., flow meters, temperature sensors, pressure sensors, power monitoring devices, etc.), or other such devices. A single adapter 222 may be configured to collect selected data items from multiple different industrial devices.

The adapter 222 comprises an edge gateway core component 206 configured to collect data 402 from selected data tags or smart objects of one or more industrial devices, and an interface adapter component 208 configured to interface the edge gateway core component 206 with the edge services 210 and 212. In some cases, the adapter 222 may be provided by a specific industrial device vendor, and as such the edge gateway core component 206 may encode knowledge of that vendor's proprietary data protocols, allowing the edge gateway core component 206 to interface with industrial devices provided by that vendor. Other adapters 222 may be configured to interface with industrial devices across various vendors that support a common type of OT data protocol such as CIP.

During operation, the edge gateway core component 206 can collect data—CIP data 402 in the illustrated example—from preselected industrial devices, such as variable frequency drive 126. Interface adapter component 208 can receive this data 402 from the edge gateway core component 206 and convert the data 402 from its native presentation and communication protocol—e.g. CIP protocol—to a protocol that can be processed by the IoT gateway system's edge services 210 and 212. In the illustrated example, the interface adapter component 208 converts the collected CIP data to MQTT protocol for consumption by the edge services 210, 212. The IoT edge system's data broker services 212 can then migrate the resulting converted data 404 to the cloud platform; e.g., via the IoT hub or directly to another cloud-based application or data lake.

Figure 5:
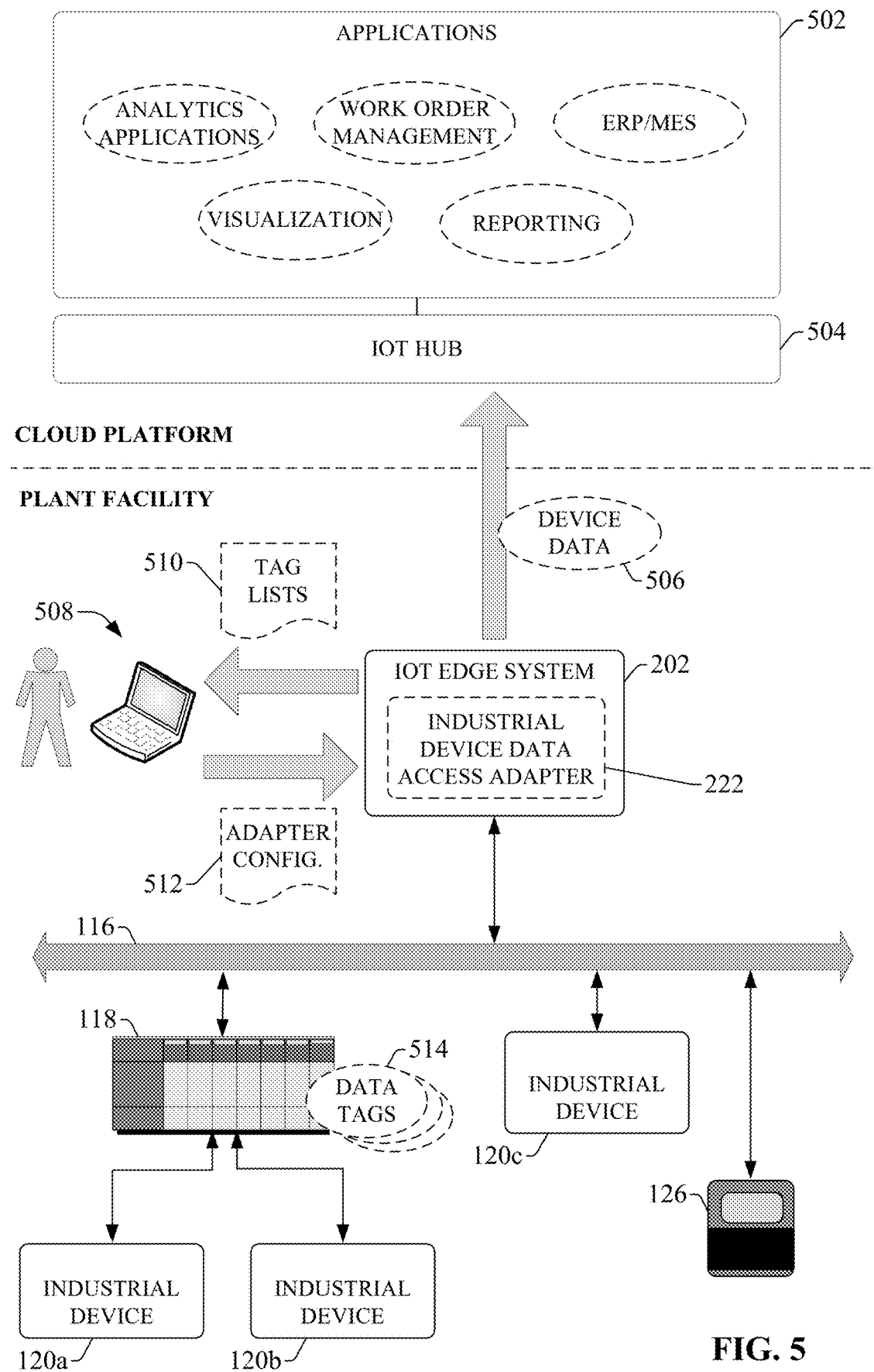
FIG. 5 is a diagram illustrating an example architecture in which an IoT edge system, executing the industrial device access adapter, can be used.

FIG. 5 is a diagram illustrating an example architecture in which the IoT edge system 202, executing the industrial device access adapter 222, can be used. In this example architecture, the IoT edge system 202 resides on a common network 116 with the various industrial devices from which data is being collecting, including industrial controllers 118, variable frequency drives 126, and other types of industrial devices 120. In some embodiments, the adapter 222 can include a user interface component 204 (see FIG. 2) that can render interface displays on a client device 508 that allow a user to configure the adapter 222 for data collection and migration. These interfaces can allow the user to specify the industrial devices from which data is to be collected by the adapter 222, as well as the data tags 514 or smart objects on those devices from which data is to be collected. In some embodiments, the user interface component 204 can present a list of industrial devices discovered on the network 116 that can serve as data sources, as well as tag lists 510 that identify the available data tags 514 (or other types of data containers) discovered on those devices. In such embodiments, the edge gateway core component 206 can be configured to poll the network 116 to discover the available devices and their associated data tags 514, which are then rendered for user selected by the user interface component 204.

The user can submit adapter configuration data 512 to the adapter 222 via interaction with the configuration interfaces. Configuration data 512 can specify the devices and associated data tags 514 from which data is to be collected, as well as other data collection properties, including but not limited to a frequency of data collection, any preprocessing to be performed on the data (e.g., filtering, compressing, etc.), or other such data migration parameters. The configuration data 512 may also specify a migration target for the collected data, which may be a cloud-based application 502, a data lake, another module 302 executing on the IoT edge system 202, or another destination. Alternatively, an administrator may specify the destination for the data via the IoT hub 504 on the cloud platform, which configures the adapter 222 according via the IoT edge system's module management services 210. In general, although FIG. 5 depicts the adapter 222 being configured via a client device 508 connected to the IoT edge system 202, configuration of the adapter 222 can also be performed through the IoT hub 504 using the IoT edge system's module management services 210, which act as a proxy for the IoT hub 504 on the IoT edge system 202.

Once the adapter 222 has been configured, the adapter's edge gateway core component 206 and interface adapter component 208 operate as described above in connection with FIG. 4, collecting data (e.g., CIP data 402) from the data tags 514 or smart objects specified by the user and converting the data 402 for use by the IoT edge system's proxy services 210, 212. In the example depicted in FIG. 5, the IoT edge system 202 sends the converted device data 506 to the IoT hub 504 on the cloud platform, which sends the data 506 to one or more cloud-based applications 502. Example applications that can serve as destinations and consumers of the data 506 can include, for example, cloud-based analytics applications, work order management systems, ERP or MES systems, visualization systems such as cloud-based HMI systems, reporting systems, or other such applications.

Figure 6:
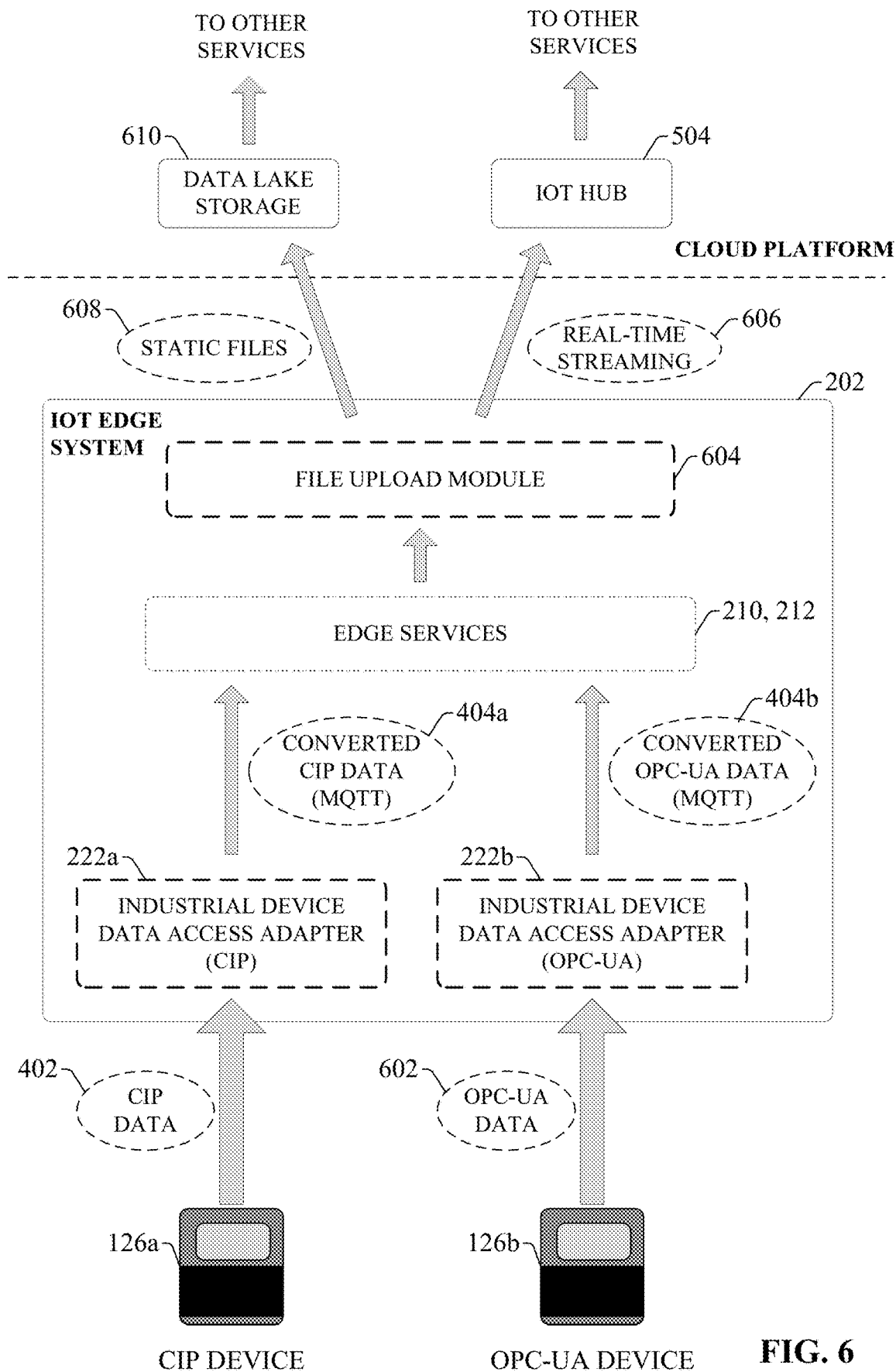
FIG. 6 is a diagram of another example architecture in which the IoT edge system executes two different types of adapters to facilitate collection of data conforming to two different industrial data exchange standards.

FIG. 6 is a diagram of another example architecture in which the IoT edge system 202 executes two different types of adapters 222 to facilitate collection of data conforming to two different industrial data exchange standards. In this example, a plant facility operates automation systems comprising disparate devices that generate data conforming to two or more data exchange standards—CIP and OPC-UA in the illustrated example. Accordingly, different types of adapters 222 can be provided whose edge gateway core components 206 support collection of data conforming to respective different industrial data standards. Adapter 222a is configured to collect and translate CIP data 402 from CIP devices (such as drive 126a) while adapter 222b is configured to collect and translate OPC-UA data from devices that support that data exchange and presentation standard (such as drive 126b). The interface adapter components 208 of both adapters 222a and 222b translate their respective data to converted data 404 for processing by the edge services 210, 212 as described above.

Although previous examples have considered scenarios in which the data broker service 212 sends the converted data 404 directly to the IoT hub 504 or another cloud-based application, in some scenarios the data broker service 212 can be instructed to send the converted data 404 to another module 302 or adapter 22. In the example illustrated in FIG. 6, another module has been installed on the IoT edge system 202 for data egress; namely, a file upload module 604 configured to upload static files to cloud-based destinations. The file upload module 604 can be configured to send the data to different destinations according to different upload priorities. For example, the file upload module 604 may send static files 608 containing the data to cloud-based data lake storage 610 on a periodic basis for archival or analytics purposes. For other cloud-based applications that require real-time processing, such as cloud-based control applications, the file upload module can send the data as a real-time data stream 606 to the IoT hub 504, which passes the data stream 606 to the destination application. The file upload module 604 can compress and package the converted data 404 according to the needs of these different data endpoints.

Some embodiments of the adapter 222 can also be configured to use the IoT edge system's framework to send data to other industry-specific modules installed on the system

Figure 7:
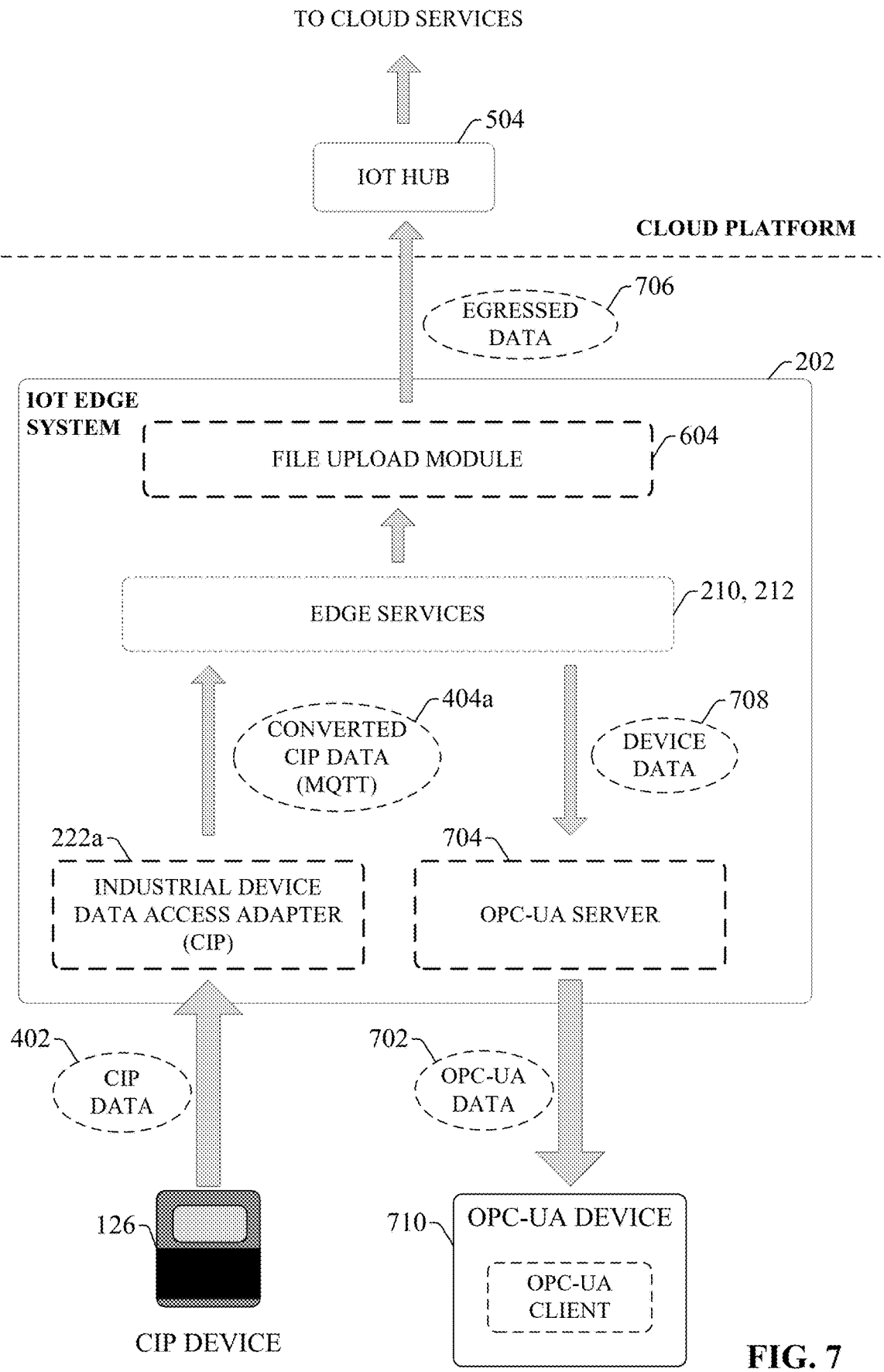
FIG. 7 is a diagram of an example scenario in which an IoT edge system has been configured with both a CIP-compatible adapter and an OPC-UA server module.

202 that are designed to interface with other industrial devices. FIG. 7 is a diagram of an example scenario in which the IoT edge system 202 has been configured with both a CIP-compatible adapter 222a and an OPC-UA server module 704. The OPC-UA server module 704 is configured to interface with industrial devices 710 that support the OPC-UA protocol, and therefore act as OPC-UA clients. The data broker services 212 can manage exchange of data between the OPC-UA server and the adapter 222a. The adapter 222a can collect and translate CIP data 402 from CIP-compatible industrial devices (such as drive 126), which cannot communicate directly with OPC-UA devices 710. The data broker services 212 can send some or all of this converted data 404a to the cloud platform as egressed data 706 (either directly or via another module, such as the file upload module 604). Additionally, the data broker services 212 may send selected sets of the converted data 404a to the OPC-UA server 704 as device data 708, which translates the device data 708 to OPC-UA format and sends the resulting OPC-UA data to the OPC-UA device 710. This arrangement of industry-specific modules—adapter 222a and OPC-UA server 704—can be installed and configured to leverage the native edge services 210, 212 of the IoT edge system 202 to perform protocol translation between a CIP device and an OPC-UA device 710. Although this example assumes CIP and OPC-UA as the two industrial protocols, adapters 222 and server modules can be provided for substantially any type of industrial protocol.

Embodiments of the industrial device data access adapter described herein can be used to easily integrate industrial devices that generate and communicate data using OT-specific protocols, such as CIP, with existing cloud infrastructures and associated IoT hub proxy services, allowing those existing cloud technologies to be used to manage collection and migration of data from those devices to cloud-based applications.

Figure 8:
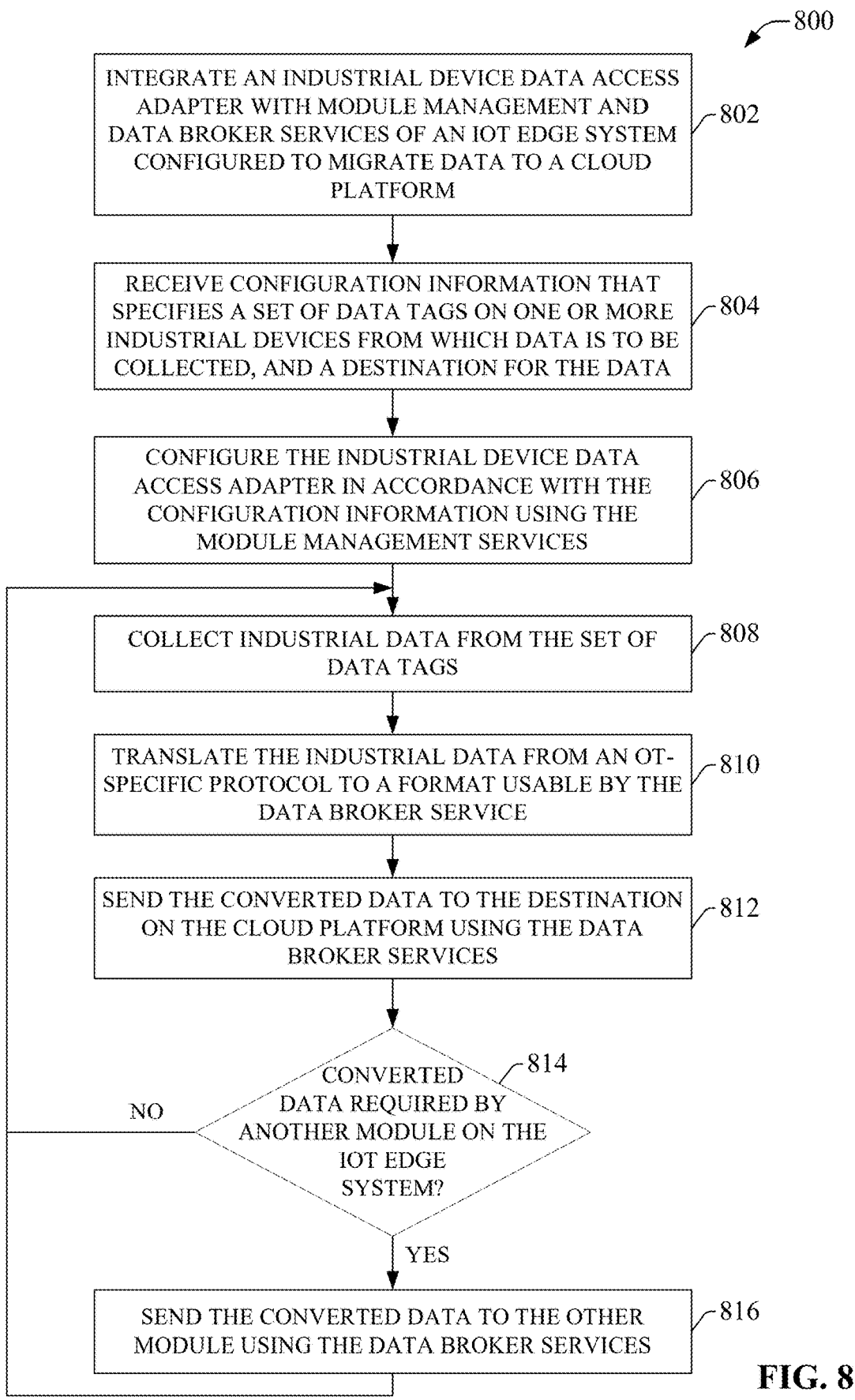
FIG. 8 is a flowchart of an example methodology for configuring and using an industrial device data access adapter on an IoT edge device.

FIG. 8 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 8 illustrates a methodology 800 for configuring and using an industrial device data access adapter on an IoT edge device. Initially, at 802, an industrial device data access adapter is integrated with module management and data broker services of an IoT edge system configured to migrate data to a cloud platform. The adapter can be a containerized application or module configured to interface with industrial devices that generate and communicate data using OT-specific protocols, and can also be configured to integrate with the cloud architecture in which the IoT edge system and its services operate.

At 804, configuration information is received that specifies a set of data tags on one or more industrial devices from which data is to be collected, as well as a destination for the data. The destination can be a target application or storage location on a cloud platform. In some scenarios, the configuration information can be deployed from the cloud platform, such as from an IoT hub that provides both data consumption and management functions for the cloud architecture. At 806, the industrial device data access adapter is configured in accordance with the configuration information received at step 804 using the module management services, which act as a proxy to the IoT hub.

At 808, industrial data is collected by the industrial device data adapter from the set of data tags. At 810, the industrial data is translated by the adapter from an OT-specific protocol such as CIP to a format usable by the data broker service. At 812, the converted data is sent to the destination on the cloud platform using the data broker services.

At 814, a determination is made as to whether the converted data is required by another module installed on the IoT edge system. If the converted data is required by the other module (YES at step 814), the methodology proceeds to step 816, where the converted data is sent to the other module using the data broker services on the IoT edge system. Steps 808-816 repeat during runtime operation of the IoT edge gateway.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 9:
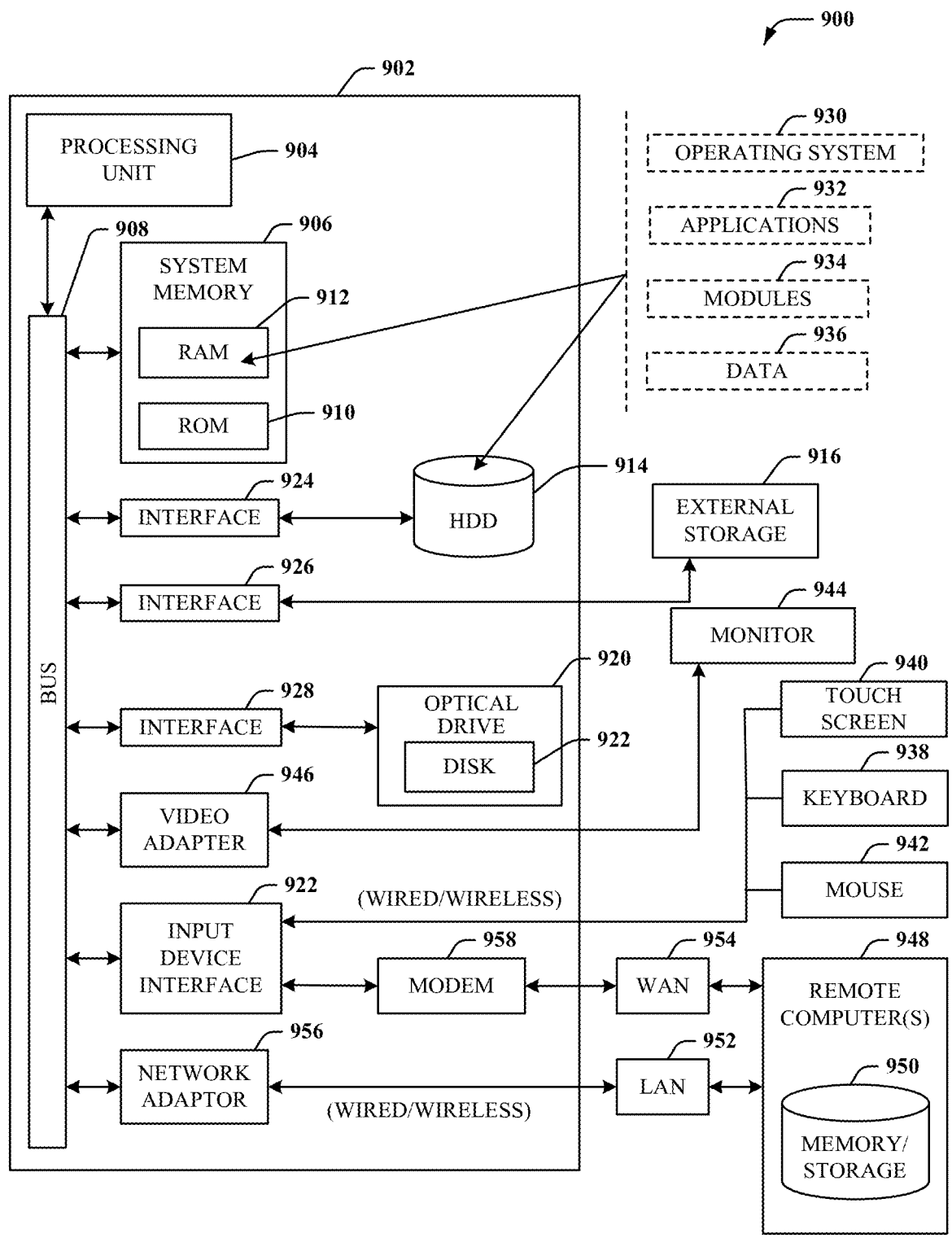
FIG. 9 is an example computing environment.
Figure 10:
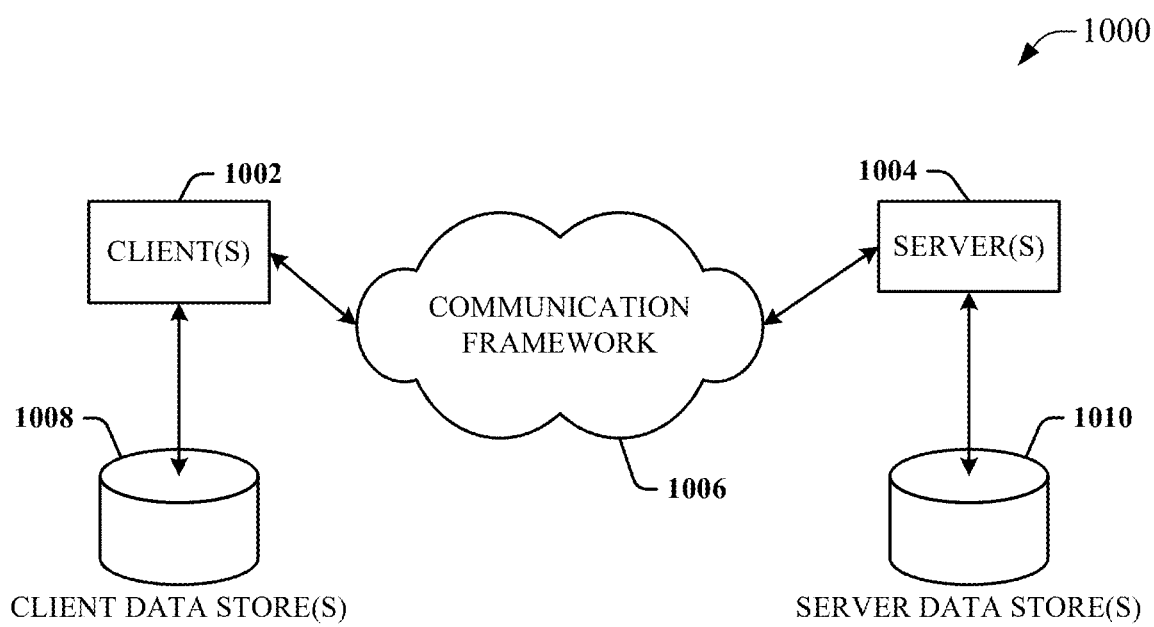
FIG. 10 is an example networking environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for application programs 932. Runtime environments are consistent execution environments that allow application programs 932 to run on any operating system that includes the runtime environment. Similarly, operating system 930 can support containers, and application programs 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless access point (AP) disposed thereon for communicating with the adapter 956 in a wireless mode.

When used in a WAN networking environment, the computer 902 can include a modem 958 or can be connected to a communications server on the WAN 954 via other means for establishing communications over the WAN 954, such as by way of the Internet. The modem 958, which can be internal or external and a wired or wireless device, can be connected to the system bus 908 via the input device interface 922. In a networked environment, program modules depicted relative to the computer 902 or portions thereof, can be stored in the remote memory/storage device 950. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 952 or WAN 954 e.g., by the adapter 956 or modem 958, respectively. Upon connecting the computer 902 to an associated cloud storage system, the external storage interface 926 can, with the aid of the adapter 956 and/or modem 958, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s)

1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
an edge gateway core component configured to communicatively interface with, and collect industrial data from, industrial devices that generate the industrial data in accordance with an operational technology (OT) protocol; and
an interface adapter component configured to interface with a data broker service and a module management service of an edge system that serve as a proxy for an Internet of Things (IoT) hub, wherein the interface adapter component uses the data broker service to migrate the industrial data to a cloud platform, and configures the edge gateway core component in accordance with a management instruction originating from the IoT hub and received via the module management service, the management instruction defining at least one of data tags of the industrial devices from which the industrial data is to be collected by the edge gateway core component or an identity of a cloud-based application to which the industrial data is to be sent by the interface adapter component.

2. The system of claim 1, wherein the OT protocol is common industrial protocol.

3. The system of claim 1, wherein the industrial adapter component is configured to translate the industrial data to a format understandable by the device broker service.

4. The system of claim 1, wherein
the interface adapter is configured to use the data broker service to send the industrial data to the cloud-based application, and
the cloud-based application is at least one of an analytics application, a work order management application, a data lake, an enterprise resource planning system, a manufacturing execution system, a visualization system, or a reporting system.

5. The system of claim 1, wherein the edge gateway core component and the interface adapter component are components of a containerized application installable on the edge system.

6. The system of claim 5, wherein the interface adapter component is configured to use the data broker service to send the industrial data to another containerized application installed on the edge system.

7. The system of claim 6, wherein
the OT protocol is a first data protocol, and
the other containerized application is a server application configured to send the industrial data to an industrial device that supports a second data protocol that is different than the first data protocol.

8. The system of claim 6, wherein the other containerized application is configured to at least one of upload static files containing the industrial data to data storage on the cloud platform or to stream the industrial data to an application on the cloud platform.

9. The system of claim 5, wherein the containerized application comprising the edge gateway core component is installed on the edge system by the module management services in response to a request from the IoT hub to install the containerized application.

10. A method, comprising:
communicatively interfacing, by an edge gateway core component of an adapter module installed on an edge device, with industrial devices that generate industrial data conforming to an operational technology (OT) protocol, wherein the edge device executes a data broker service and a module management service that serve as a proxy for an Internet of Things (IoT) hub;
collecting, by the edge gateway core component, the industrial data from the industrial devices;
coordinating, by an interface adapter component of the adapter module, with the data broker service to migrate the industrial data to a cloud platform; and
configuring, by the interface adapter component, the collecting and the coordinating in accordance a management instruction that originates from the IoT hub and is received via module management service, wherein the management instruction defines at least one of data tags of the industrial devices from which the industrial data is to be collected by the edge gateway core component or an identity of a cloud-based application to which the industrial data is to be sent by the interface adapter component.

11. The method of claim 10, wherein the OT protocol is common industrial protocol.

12. The method of claim 10, further comprising translating, by the industrial adapter component, the industrial data to a format consumable by the device broker service.

13. The method of claim 10, wherein
the coordinating comprises sending, using the data broker service, the industrial data to the cloud-based application, and
the cloud-based application is at least one of an analytics application, a work order management application, a data lake, an enterprise resource planning system, a manufacturing execution system, a visualization system, or a reporting system.

14. The method of claim 10, wherein the edge gateway core component and the interface adapter component are components of a containerized application installed on the edge device.

15. The method of claim 14, further comprising coordinating, by the interface adapter component, with the data broker service to send the industrial data to another containerized application installed on the edge device.

16. The method of claim 15, wherein
the OT protocol is a first data protocol, and
the other containerized application is a server application configured to send the industrial data to an industrial device that supports a second data protocol that is different than the first data protocol.

17. The method of claim 15, wherein the other containerized application is configured to at least one of upload static files containing the industrial data to data storage on the cloud platform or to stream the industrial data to an application on the cloud platform.

18. The method of claim 14, further comprising installing the containerized application on the edge device in response to a request from the IoT hub to install the containerized application.

19. A non-transitory computer-readable medium having stored thereon instructions that, in response to execution, cause an edge system comprising a processor to perform operations, the operations comprising:
communicatively interfacing, by an edge gateway core component of an adapter application installed on the edge device, with industrial devices that generate data conforming to an operational technology (OT) protocol, wherein the edge system executes a data broker service and a module management service that serve as a proxy for an Internet of Things (IoT) hub;
collecting, by the edge gateway core component, the data from the industrial devices;
coordinating, by an interface adapter component of the adapter application, with the data broker service to migrate the data to a cloud platform; and
configuring, by the interface adapter component, the collecting and the coordinating based on a management command originating from the IoT hub and received via the module management service, wherein the management command specifies at least one of data tags of the industrial devices from which the data is to be collected by the edge gateway core component or an identity of a cloud-based application to which the data is to be sent by the interface adapter component.

20. The non-transitory computer-readable medium of claim 19, wherein the OT protocol is common industrial protocol.

* * * * *